US012619951B2

(12) United States Patent　　　　(10) Patent No.:　US 12,619,951 B2
Yasuda et al.　　　　　　　　　　(45) Date of Patent:　　May 5, 2026

(54) SYSTEM AND METHOD FOR FINDING OCCLUDED CARGO

(71) Applicant: TOYOTA RESEARCH INSTITUTE, INC., Los Altos, CA (US)

(72) Inventors: Hiroshi Yasuda, San Francisco, CA (US); Manuel Ludwig Kuehner, Mountain View, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 17/726,332

(22) Filed: Apr. 21, 2022

(65) Prior Publication Data

US 2023/0342718 A1　　Oct. 26, 2023

(51) Int. Cl.
| | |
|---|---|
| *G06Q 10/0875* | (2023.01) |
| *B60K 35/10* | (2024.01) |
| *B60K 35/21* | (2024.01) |
| *B60K 35/23* | (2024.01) |
| *B60K 35/28* | (2024.01) |
| *B60K 35/60* | (2024.01) |
| *G06T 7/70* | (2017.01) |

(Continued)

(52) U.S. Cl.
CPC ......... *G06Q 10/0875* (2013.01); *B60K 35/10* (2024.01); *B60K 35/211* (2024.01); *G06T 7/70* (2017.01); *G06T 15/205* (2013.01); *G06T 19/006* (2013.01); *G06V 20/20* (2022.01); *G06V 20/59* (2022.01); *B60K 35/23* (2024.01); *B60K 35/28* (2024.01); *B60K 35/60* (2024.01);

*B60K 2360/176* (2024.01); *B60K 2360/177* (2024.01); *G06T 2207/10016* (2013.01); *G06T 2207/30268* (2013.01); *G06T 2215/16* (2013.01)

(58) Field of Classification Search
CPC ............ G06Q 10/087; G06Q 30/0643; G06Q 30/0623; G06Q 10/0875; G06Q 30/0631; G07F 11/00; G07F 9/00; G06F 3/0485; G06F 3/0482; G06F 3/04855
See application file for complete search history.

(56) References Cited

U.S. PATENT DOCUMENTS

| | | | |
|---|---|---|---|
| 8,948,442 | B2 | 2/2015 | Breed |
| 10,161,746 | B2 | 12/2018 | Ochsendorf |

(Continued)

FOREIGN PATENT DOCUMENTS

WO　　2017196226 A1　　11/2017

*Primary Examiner* — Florian M Zeender
*Assistant Examiner* — Vanessa Deligi
(74) *Attorney, Agent, or Firm* — SHEPPARD, MULLIN, RICHTER & HAMPTON LLP; Daniel N. Yannuzzi

(57) ABSTRACT

The disclosure generally describes a system for monitoring a storage compartment of a vehicle comprising a first sensor configured to detect a loading or unloading event, a second sensor configured to capture data regarding one or more items within the storage compartment of the vehicle, wherein the second sensor captures video data of the one or more items within the storage compartment of the vehicle in response to the first sensor detecting a loading or unloading event, and a virtual imaging system configured to classify each item in the storage compartment, generate a virtual replication of each item within the storage compartment, and transmit the virtual replication to a user device.

21 Claims, 6 Drawing Sheets

(51) Int. Cl.

| | |
|---|---|
| *G06T 15/20* | (2011.01) |
| *G06T 19/00* | (2011.01) |
| *G06V 20/20* | (2022.01) |
| *G06V 20/59* | (2022.01) |

(56) References Cited

U.S. PATENT DOCUMENTS

| | | | | |
|---|---|---|---|---|
| 10,302,807 | B2 | 5/2019 | Yu | |
| 10,311,315 | B2 | 6/2019 | Drazan | |
| 10,331,964 | B2 | 6/2019 | Kanagaraj | |
| 11,495,003 | B1 * | 11/2022 | Agarwal | G06Q 30/0643 |
| 11,501,244 | B1 * | 11/2022 | Hill | G06K 7/1413 |
| 11,620,822 | B1 * | 4/2023 | Ron | G06Q 20/208 |
| | | | | 382/103 |
| 2013/0321397 | A1 * | 12/2013 | Chen | G06T 19/00 |
| | | | | 345/419 |
| 2019/0355193 | A1 * | 11/2019 | Kirsch | G06V 20/52 |
| 2021/0192780 | A1 | 6/2021 | Kulkarni | |
| 2021/0216955 | A1 * | 7/2021 | Gizatov | G06T 19/006 |
| 2021/0217017 | A1 * | 7/2021 | Scott | G06V 20/52 |
| 2021/0319582 | A1 * | 10/2021 | Sangeneni | G06T 7/62 |
| 2022/0262117 | A1 * | 8/2022 | Naslavsky | G06V 10/96 |
| 2022/0398300 | A1 * | 12/2022 | Morgan | G06Q 10/08 |

* cited by examiner

SYSTEM AND METHOD FOR FINDING OCCLUDED CARGO

TECHNICAL FIELD

The present disclosure relates generally to a system and method for monitoring storage compartments, and in particular, some implementations relate to assisting a user in finding the location of items in a storage compartment of a vehicle using one or more sensors.

DESCRIPTION OF RELATED ART

Typically, when a person loads various items into a storage compartment of a vehicle, he or she must remember what items he or she loaded, and where each item is placed within the storage compartment of the vehicle. However, sometimes people forget which items are stored in the vehicle's storage compartment and where they are stored. This is especially true, when items located in the storage compartment are occluded or blocked by other items, making it difficult to find the blocked items.

Therefore there is a need in the art for a system and method for inventorying loaded items, and assisting a person in finding occluded items in the storage compartment of a vehicle.

BRIEF SUMMARY OF THE DISCLOSURE

The according to various embodiments of the disclosed technology the item management system for inventorying a storage compartment of a vehicle includes a processor, and a memory having computer readable instructions stored thereon, which when executed by the processor, causes the processor to: capture data from a sensor, the data comprising information regarding one or more items within the storage compartment of the vehicle; create a three dimensional virtual replication of the storage compartment of the vehicle from the captured data, wherein the three dimensional virtual replication of the storage compartment includes a virtual replication of one or more occluded items in the storage compartment; and transmit the three dimensional virtual replication of the storage compartment, based on the captured data, to a viewing device.

In another embodiment, the system includes a first sensor configured to detect a loading or unloading event, and a second sensor configured to capture data relating to one or more items with the storage compartment of the vehicle, wherein the second sensor captures data of the one or more items in response to the first sensor detecting a loading or unloading event, and transmit the captured data to a virtual imaging system, wherein the virtual imaging system is configured to create a first virtual replication of the storage compartment of the vehicle from the captured data, and transmit a second virtual replication comprising the first virtual replication and the one or more unique identifiers to a viewing device.

The disclosed technology further includes a method of monitoring a storage compartment of a vehicle. The method includes receiving video data of one or more items in the storage compartment, wherein the video data is captured during a first time duration by one or more cameras, wherein the first time duration starts when a storage compartment door is opened and stops when the storage compartment door is closed, creating a first virtual replication of the storage compartment based on the captured data, wherein the first virtual storage compartment is a virtual rendering of the physical storage area of the vehicle, classifying each item in the storage compartment, wherein classifying each item includes creating one or more unique identification labels for each item in the storage area and transmitting a second virtual replication that includes the first virtual replication and the one or more unique identification labels to a viewing device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
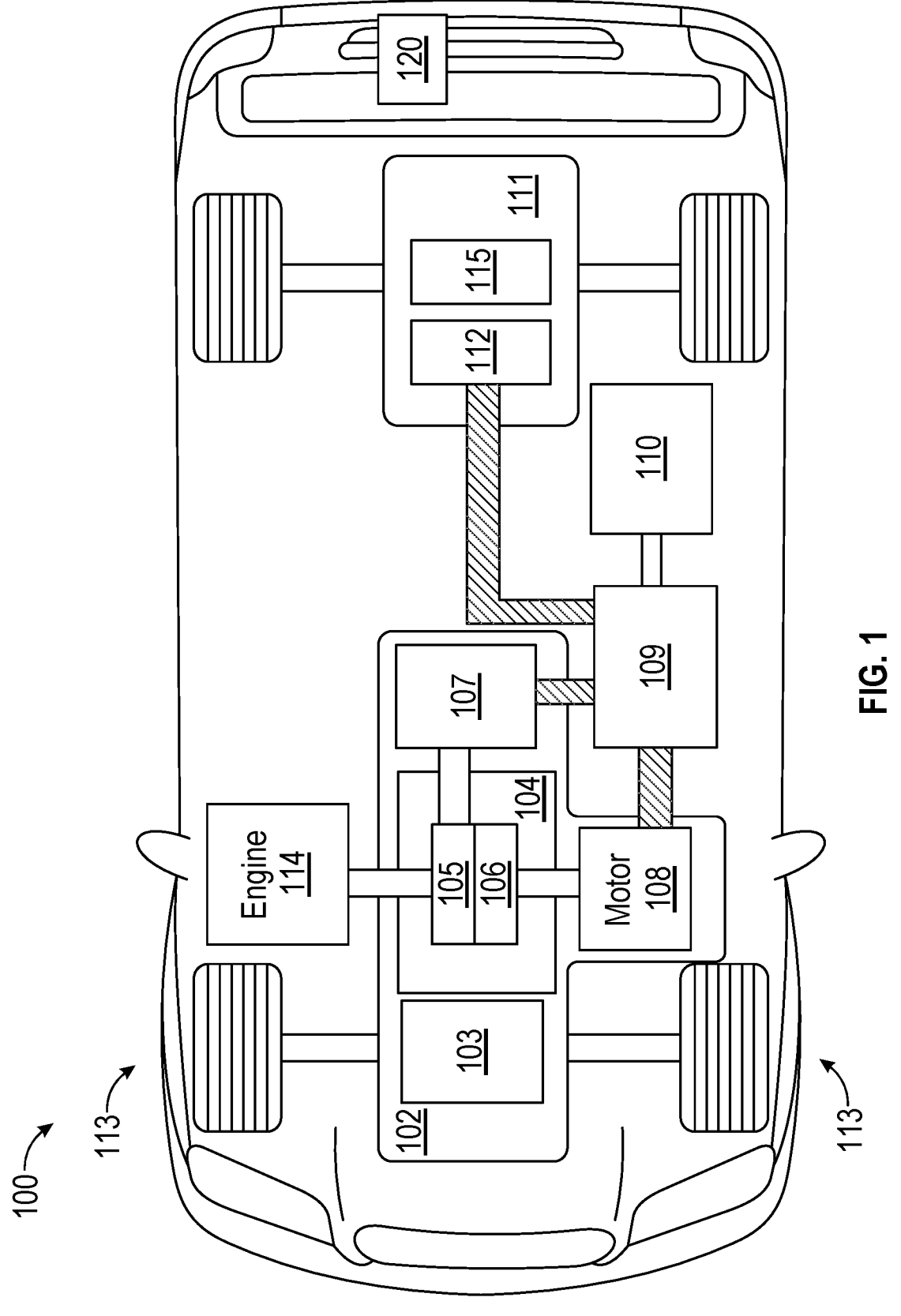
FIG. 1 illustrates an example of a vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein provide an item management system to detect the inventory of a vehicle's cargo compartment using sensors. Using one or more sensors, the item management system captures images of objects in the cargo area in response to the system detecting a user loading and/or unloading objects into the cargo area. In one embodiment, the system includes one or more strategically placed cameras that can monitor a storage compartment of a vehicle, and a door open/close sensor to determine when a door to a storage compartment is open. The storage compartment includes any vehicle compartment capable of storing items (e.g., a vehicle trunk, pickup bed, SUV storage area, truck cargo area, trailer, and so on). In one embodiment, the item management system includes an augmented reality (AR) and/or virtual reality (VR) device that visualizes the location of items, including occluded items, stored within the storage compartment. VR devices (such as headsets, glasses, goggles, etc.) can be used for VR or AR applications (or both), as well as for other headset/goggle viewing applications. However, for ease of description the term VR devices is used in this document to describe VR, AR and other display devices. Using the AR and/or VR device, a user can view the arrangement in which the user placed the cargo in the cargo space. The item management system can further point out cargo placed in occluded areas of a cargo area, and may also categorize each piece of cargo to facilitate location. In one embodiment, the item management system receives data captured by a sensor and creates a virtual storage compartment that includes the location of items stored within the storage compartment in a 3D space. In another embodiment, the item management system uses a computer vision processor ("classifier") to classify each item placed in the storage compartment of the cargo area. In one embodiment, each item is classified, inventoried, and displayed to the user as a list.

In one embodiment, the item management system creates a three dimensional virtual replication of the storage compartment. In this embodiment, the three dimensional virtual replication of the storage compartment is configured to allow a user to virtually search through the three dimensional virtual replication to locate one or more occluded (and unoccluded) items. In one embodiment, a viewer can use a virtual reality device to search through the virtual representation to isolate each one of the one or more occluded items within the storage compartment of the vehicle. Specifically, embodiments may allow the user to scroll through a virtual representation of each item in the storage compartment on the viewing device, thus allowing the user to search through the virtual replication of the storge compartment to determine the location of the one or more occluded items within the storage compartment. This may include a virtual representation of the items in the same relative positions as they were placed in the cargo area. In addition, in one embodiment, the virtual reality device includes an augmented reality device configured to display a virtual representation of one or more occluded items over physical images of one or more non-occluded items in the storage compartment.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well, including aircraft, trains, ships, and so on. An example of a hybrid electric vehicle (HEV) in which embodiments of the disclosed technology may be implemented is illustrated in FIG. 1. Although the example described with reference to FIG. 1 is a hybrid type of vehicle, the systems and methods can be implemented in other types of vehicle including gasoline- or diesel-powered vehicles, fuel-cell vehicles, electric vehicles, or other vehicles.

The automobile in FIG. 1 includes an engine 114 and one or more electric motors 108, 112 as sources of motive power. In this example, a hybrid transaxle 102 includes front differential 103, a compound gear unit 104, a motor 108, and a generator 107. Compound gear unit 104 includes a power split planetary gear unit 105 and a motor speed reduction planetary gear unit 106. This example vehicle also includes front and rear drive motors 108, 112, an inverter with converter assembly 109, batteries 110, and a rear differential 115. The hybrid transaxle assembly 102 enables power from engine 101, motor 108, or both to be applied to front wheels 113 via front differential 103.

The inverter with converter assembly 109 inverts DC power from batteries 110 to create AC power to drive AC motors 108, 112. In embodiments where motors 108, 112 are DC motors, no inverter is required. Inverter with converter assembly 109 also accepts power from generator 107 (e.g., during engine charging) and uses this power to charge batteries 110.

The example of FIG. 1 is provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
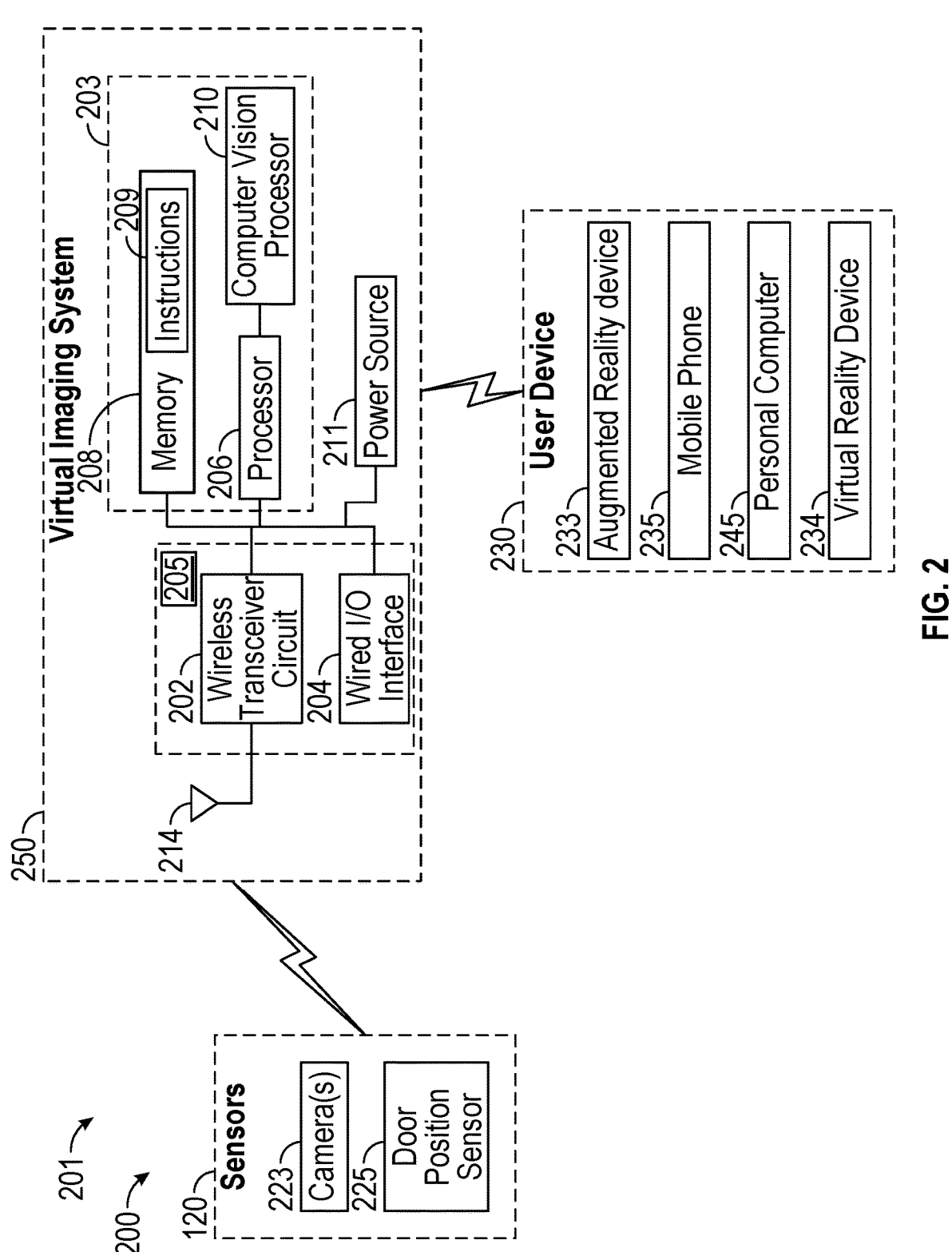
FIG. 2 illustrates an example architecture for detecting the location of occluded items stored within the storage compartment, according to some embodiments.

FIG. 2 illustrates an example architecture 201 for the item location system 200. The example architecture 201 includes a virtual imaging system 250, sensors 120, and a user device 230 (i.e., viewing device). The virtual imaging system 250 includes a decision circuit 203, a communication circuit 205, an antenna 214 and a power source 211. The decision circuit 203 includes memory 208 (e.g., a database), instructions 209, a processor 206, and a computer vision processor (CVP) 210. The communication circuit 205 includes a wireless transceiver circuit 202, and a wired I/O interface 204. The sensors 120 include one or more cameras 223, and a door position sensor 225. However, the sensors 120 can include any type of sensor capable of capturing cargo space data and monitoring the door position. The user device 230 includes an augmented reality (AR) device 233, a virtual reality (VR) device 234, a mobile phone 235, and personal computer 245. As explained in further detail below the user device 230 includes any device capable of receiving and sending data to the virtual imaging system 250. Furthermore, in some embodiments, the AR devices and the VR devices include in-vehicle viewing devices such as a heads-up displays, that can project an AR or VR feed onto a vehicle's window, navigation screens, digital gauge clusters, and/or any auxiliary screens capable of displaying video and/or images.

The sensors 120 communicate with the virtual imaging system 250 via a wireless communication interface. Although sensors 152 are depicted as communicating with the virtual imaging system 250, they can also communicate with each other as well as with other vehicle systems. As seen in FIG. 2A, one or more cameras 223 capture and send video data to the virtual imaging system 250. The captured video data includes video frames, audio packets, and associated metadata. In one configuration, the video data includes video frames stored in memory 208 as a series of individual images.

The door position sensor 225 monitors the open or closed position of a vehicle door and sends door position data to the virtual imaging system 250. The vehicle door includes any door(s) in an automobile (e.g., the front door, back door, trunk door). In one embodiment, the door position sensor 225 monitors the position of the trunk door. In another embodiment, the door position sensor 225 includes a push switch in the door frame that is pushed in when the door is closed and pops open when the door is open, allowing electrical current to flow when the door is open. In this embodiment, a door monitor (not shown) gathers information on the door position, and relays the information to the virtual imaging system 250 as door data.

The virtual imaging system 250 includes a communication circuit 201, a decision circuit 203 and a power source 211. The decision circuit 203 includes a processor 206 and memory 208 (e.g., a database). The virtual imaging system 250 is compatible with and can support one or more standard or non-standard messaging protocols. Components of the virtual imaging system 250 are illustrated as communicating with each other via a data bus, although other communication interfaces can be included. Assist-mode detection/activation circuit 210 in this example also includes a manual assist switch 205 that can be operated by the user to manually select the assist mode. The virtual imaging system 250 is configured to execute one or more steps of the methods described herein. In one embodiment, the virtual imaging system 250 is located (i.e., hosted) outside of the vehicle (for example, at a central data center). In another embodiment, the virtual imaging system 250 is located within the vehicle.

The processor 206 can include a GPU, CPU, micropro-cessor, or any other suitable processing system. The memory 208 can include one or more various forms of memory or data storage (e.g., flash, RAM, etc.) used to store the calibration parameters, images (analysis or historic), point parameters, instructions and variables for processor 206 as well as any other suitable information. The memory 208, can be made up of one or more modules of one or more different types of memory, and may be configured to store data and other information as well as operational instructions that may be used by the processor 206 to assist-mode detection/ activation circuit 210. In one embodiment, the memory includes a server database for storing data gathered by the one or more sensors 120.

The virtual imaging system 250 further includes a com-puter vision processor ("classifier") to classify each item placed in the storage compartment. The classifier determines the type of item placed in the storage compartment. For example, if a person places one or more items in the storage compartment that include a banana, an orange, a gallon of milk, and a box of paper towels, the classifier can identify each item as a banana, an orange, a gallon of milk, and a box of paper towels. In one embodiment, each item is classified, inventoried, and displayed to the user as a list. The granu-larity by which the classifier identifies each item in the storage compartment can vary by classifier. However, any classifier implemented by the item management system 200 can at a minimum detect the type of item placed in the storage compartment (for example, a bag vs. a type of fruit, or an apple vs. a banana).

Although the example of FIG. 2 is illustrated using processor and memory circuitry, as described below with reference to circuits disclosed herein, the virtual imaging system can be implemented utilizing any form of circuitry including, for example, hardware, software, or a combina-tion thereof. By way of further example, one or more processors, controllers, ASICs, PLAS, PALs, CPLDs, FPGAs, logical components, software routines or other mechanisms might be implemented to make up a assist-mode detection/activation circuit 210.

Communication circuit 201 is embodied as either or both a wireless transceiver circuit 202 with an associated antenna 214 and/or a wired I/O interface 204 with an associated hardwired data port (not illustrated). Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well.

Wired I/O interface 204 can include a transmitter and a receiver (not shown) for hardwired communications with other devices. For example, wired I/O interface 204 can provide a hardwired interface to other components, includ-ing sensors 152 and vehicle systems 158. Wired I/O inter-face 204 can communicate with other devices using Ethernet or any of a number of other wired communication protocols whether standardized, proprietary, open, point-to-point, net-worked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Figure 3:
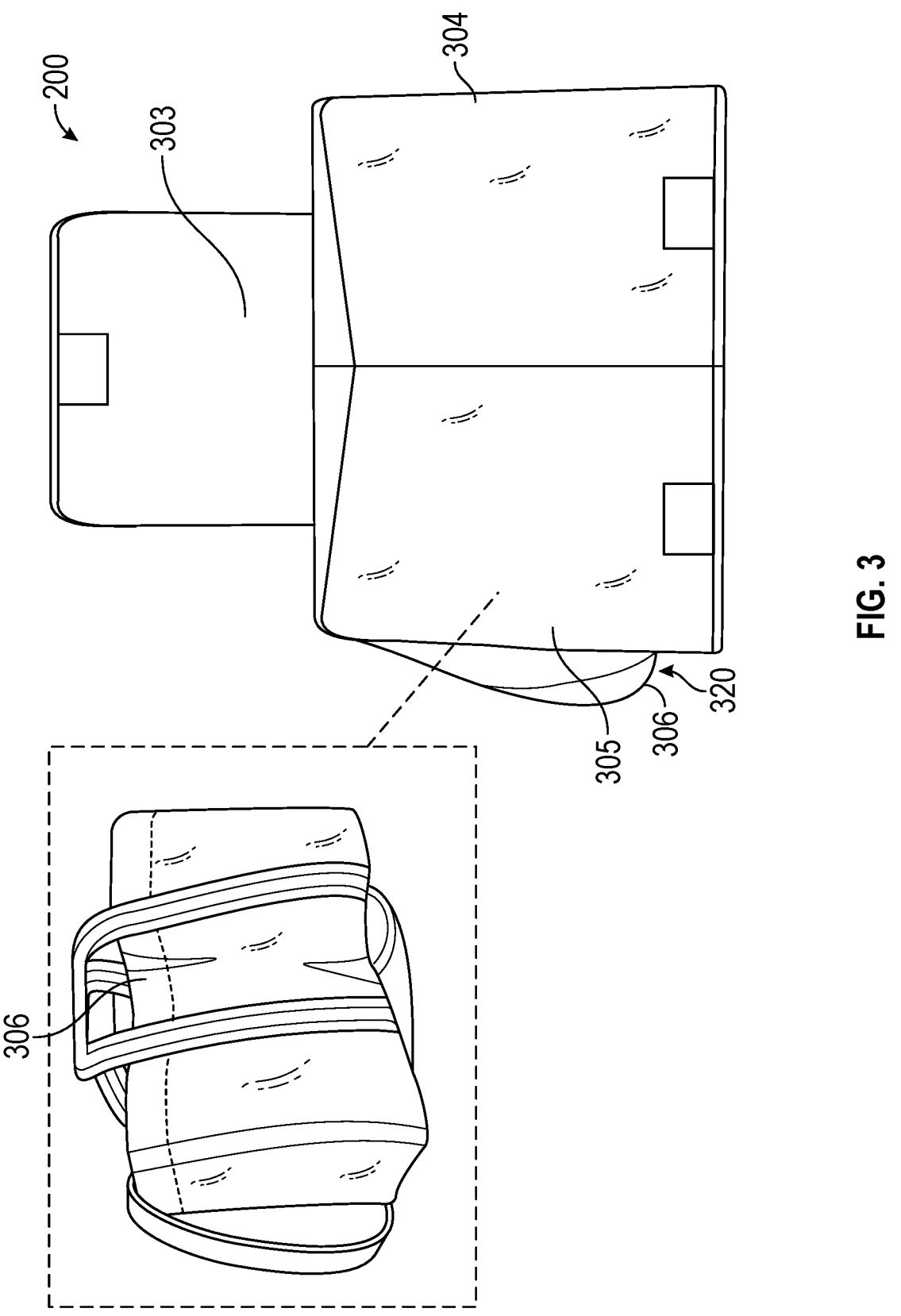
FIG. 3 illustrates an example of an occluded item in a storage compartment, according to some embodiments.

FIG. 3 illustrates an example of an occluded item in a storage compartment. In this example, a plurality of items 303-306 are placed in the storage compartment. The storage compartment of the vehicle may contain fewer or more items in the storage compartment. The number of items shown in FIG. 3 are not meant to limit the number of items that can be stored in the storage compartment of the trunk. As seen further in FIG. 3, the illustration is taken from a first person point of view looking into the storage compartment of the vehicle. From this point of view, item 306 is hidden behind item 305. Thus from the user's perspective, item 306 is an occluded item 320.

As seen in the example in FIG. 3, item 306 is a bag, and items 303-305 are boxes. The boxes obstruct the view of the bag. Thus a person loading or unloading a vehicle would not be able to see the obstructed bag. To find item 306, the user would have to waste time searching through items 303-305 in the storage compartment of the vehicle. This problem is exacerbated when a large number of cargo items are in storage. By using one or more cameras 223, the item management system 200 is able to capture video or still image data pertaining to each item in the storage compart-ment. The item management system 200 uses the captured image data to classify each item and create a virtual repli-cation of the storage compartment and each item inside.

By viewing the virtual replication of the storage compart-ment on their user device (e.g., VR headset), a person (i.e., user) is able to determine whether or not an item is present in the physical storage compartment of the vehicle, and where it is located, without having to physically search through each item 303-305 in the vehicle's storage com-partment to find the occluded item 320. In one embodiment, a person is able to use his or her user device to access a list of each item in the storage compartment. The list may be used with or without the virtual replication of the storage area. Furthermore, as explained in further detail in FIGS. 6A-6B, in one embodiment, a person is able to use a playback feature 608 on their user device to view a time lapse of each item the user placed in the trunk. The user playback feature 608 is further discussed in FIGS. 6A-6B.

Figure 4:
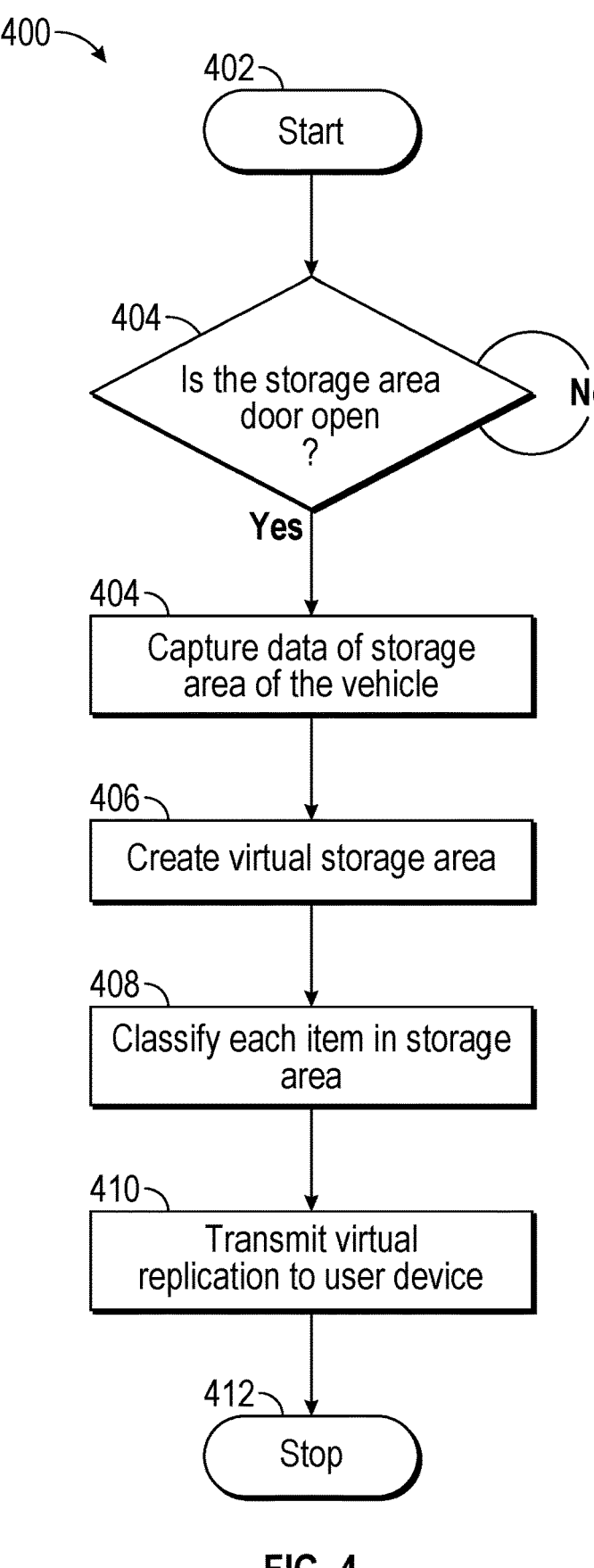
FIG. 4 illustrates an example of a method of detecting the location of occluded items, according to some embodiments.

FIG. 4 illustrates an example method of detecting the location of occluded items using the item location system 200. The method 400 includes determining whether the storage door is opened, capturing data of one or more items in the storage area of the vehicle, creating a virtual replica-tion of the storage area, classifying each item in the storage area, and displaying the location of the one or more items on a user device. As seen in FIG. 4 the method further includes starting and stopping.

At activity 402, the method 400 includes determining whether the storage door is open. As previously mentioned, the item management system 200 is in communication with the door position sensor 225 to determine whether the storage door is opened or closed. If the storage door is opened, the item management system 200 captures data pertaining to the storage area. If the storage door is closed, the item management system 200 does not capture data.

At activity 404, the method 400 includes capturing data of the storage area of the vehicle. As previously mentioned the captured data can include video and/or image data. The data is captured by the one or more cameras 223. In one embodiment, the item management system captures video data during a first duration. The first duration is bounded by a first time that starts when the storage compartment door is opened and by a second time that stops when the storage door is closed. For example, when a person opens the storage compartment door, one or more cameras start to capture video data of each item that the person places in the storage compartment. Once the person finishes loading each item into the storage compartment and closes the compartment door, the cameras stop capturing video data.

In one embodiment, the captured data includes a plurality of images and/or video data sufficient to scan the area of the storage compartment of the vehicle. The scan of the storage area of the vehicle can include data sufficient to create a three dimensional mapping of the storage area. Any suitable mapping processes can be used to actively scan and generate data associated with the location of each item in the storage area.

In addition, data captured by each camera 223 may be stitched together to create a composite data stream. For example, a first data stream gathered by a first camera having a first view may be combined with a second data stream gathered by a second camera having a second view to create a composite view of the storage compartment. By combining the first camera view with the second camera view, the item management system 250 is able to create a full field-of-view (FFOV) of every item in the storage compartment.

In one embodiment, captured data from a first camera having a first field-of-view is sent to and received by the virtual imaging system 250, and captured data from a second camera having a second field-of-view is sent to and received by the virtual imaging system 250. The virtual imaging system 250 then combines the first field-of-view from the first camera with the second field-of-view from the second camera to create a FFOV that, when combined, captures the entire storage area. As previously mentioned, the item management system 200 can include any number of cameras 223 necessary to capture sufficient data to create a virtual storage compartment that replicates the physical storage compartment.

The one or more cameras 223 capture data throughout a time duration. In one embodiment, the one or more cameras 223 capture data through a first time duration that is bounded by a person opening and closing the storage compartment door. In this embodiment, the first time during begins when the item management system 200 receives a signal from the door position sensor 225 that the storage compartment door is open. The first time during ends when the item management system 200 receives a signal from the door position sensor 225 that the storage compartment door is closed. As previously mentioned, the sensors 120 (e.g., cameras 223 and door position sensor 225) are in continuous communication with the item management system 200. Thus, in this embodiment, the one or more cameras 223 begin capturing video data during a first time period initiated by the door position sensor 225 communicating to the virtual imaging system 250 that the compartment door is opened, and the stop capturing data when the door position sensor 225 communicates to the virtual imaging system 250 that the door is closed.

In addition, as the item management system 250 receives packets of captured data, the item management system 250 is able to create a timeline of data received during a desired timeframe. For example, by sequentially receiving packets of data from the one or more cameras 223, the item management system 250 can generate metadata pointing to a specific time that each packet (or group of packets) was received. The metadata pointing to each packet or group of packets can used to create a timestamp of when each item was placed in the storage compartment. By timestamping when each item was placed in a storage compartment, the virtual imaging system allows for a playback feature to provide the user the ability to view one or more images of each virtual item across a timeline. Thus, allowing a user to easily scroll through the virtual replication of the storage area to determine whether or not an item is present. The playback feature is explained in further detail in the discussion of FIG. 6. below.

Furthermore, as previously mentioned, capturing data is not limited to only cameras 223. In some configurations it may be useful to use other sensors 120 in addition to the previous mentioned sensors to generate/capture data regarding the items stored in the storage area. For example, the sensors 120 may further include active or passive RFID sensors to assist in inventorying (e.g., classifying and listing) the items in the storage area.

At activity 406, the method 400 includes creating a virtual replication of the storage area. Here, the virtual imaging system 250 forms a virtual replication of the storage area using captured data from the one or more cameras 223. The virtual storage compartment includes the items stored within the physical storage compartment. The virtual storage compartment is stored in memory and can be accessed by the user on their user device. In one embodiment, the virtual replication of the storage compartment is stored in a remote database that can be accessed by a user on a user device.

At activity 408, the method 400 includes classifying each item in the storage compartment. Each item in the storage compartment is classified using the computer vision processor (CVP). As previously mentioned, the CVP creates a unique identifier for each item. In some embodiments, the unique identifier is overlayed over the virtual replication of each item to assist a user in determining which item is present in the storage compartment. In one embodiment, activity 408 includes creating a virtual replication of the storage area in parallel with classifying each item in the storage area. In another embodiment, activity 408 includes classifying each item in the storage area prior to creating a virtual replication of the storage area. In this embodiment, the CVP 210 classifies each item in the storage compartment prior to the virtual imaging system 250 creating a virtual replication of the storage area.

At activity 410, the method 400 includes transmitting a virtual replication of each item to a user device. In one embodiment, the virtual replication of the items is transmitted to an augmented reality (AR) device 233. Transmitting the virtual replication of the one or more items in AR includes overlaying a virtual replication of one or more items over one or more images of the physical storage compartment captured by the one or more cameras 223. Examples of some suitable AR devices 233 include heads up displays (HUDs), holographic displays, and smart glasses.

In another embodiment, the items are transmitted to a virtual reality (VR) device 233. Examples of suitable VR devices 234 include head mounted displays (HMD) such as the Oculus Rift®, or the HTC Vive®, Playstation VR®, or Oculus Quest®. Transmitting each item in virtual reality allows the user to view each item in three dimensional space. Furthermore, by displaying each item in three dimensional space, the user is able to sort through each item in the storage compartment to individually determine whether or not the item in present in the storage compartment. For example, in one embodiment, the user can rotate the display view about an imaginary central point within the virtual representation to view each item within the virtual representation from any display angle. In another embodiment, the items are displayed on a mobile device, and/or personal computer 245. As seen further in FIG. 6, the user device can include a playback feature 608.

Furthermore, in one embodiment, transmitting the virtual replication includes transmitting a first virtual replication without unique identifiers for each item overlayed over each item in the virtual replication of the storage compartment. In another embodiment, transmitting the virtual replication includes transmitting a second virtual replication with one or more unique identifiers for each item overlayed over each item in the virtual replication of the storage compartment.

Figure 5:
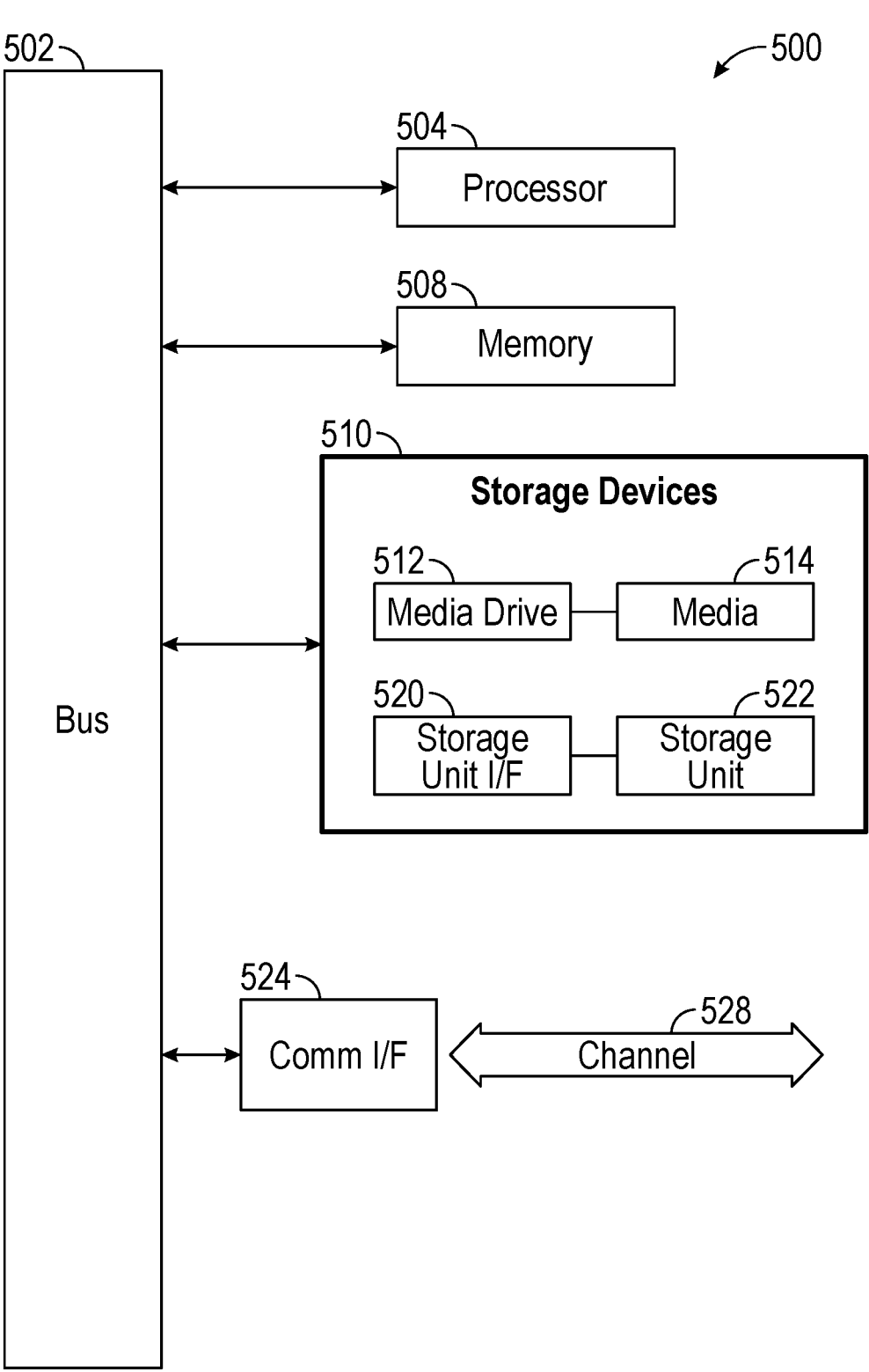
FIG. 5 illustrates an example computing component that may be used to implement various features of embodiments described in the present disclosure, according to some embodiments.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within the a self-adjusting display, desktop, laptop, notebook, and tablet computers. They may be found in hand-held computing devices (tablets, PDA's, smart phones, cell phones, palmtops, etc.). They may also be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up the virtual imaging system 250 and user device 230. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

Figures 6A, 6B:
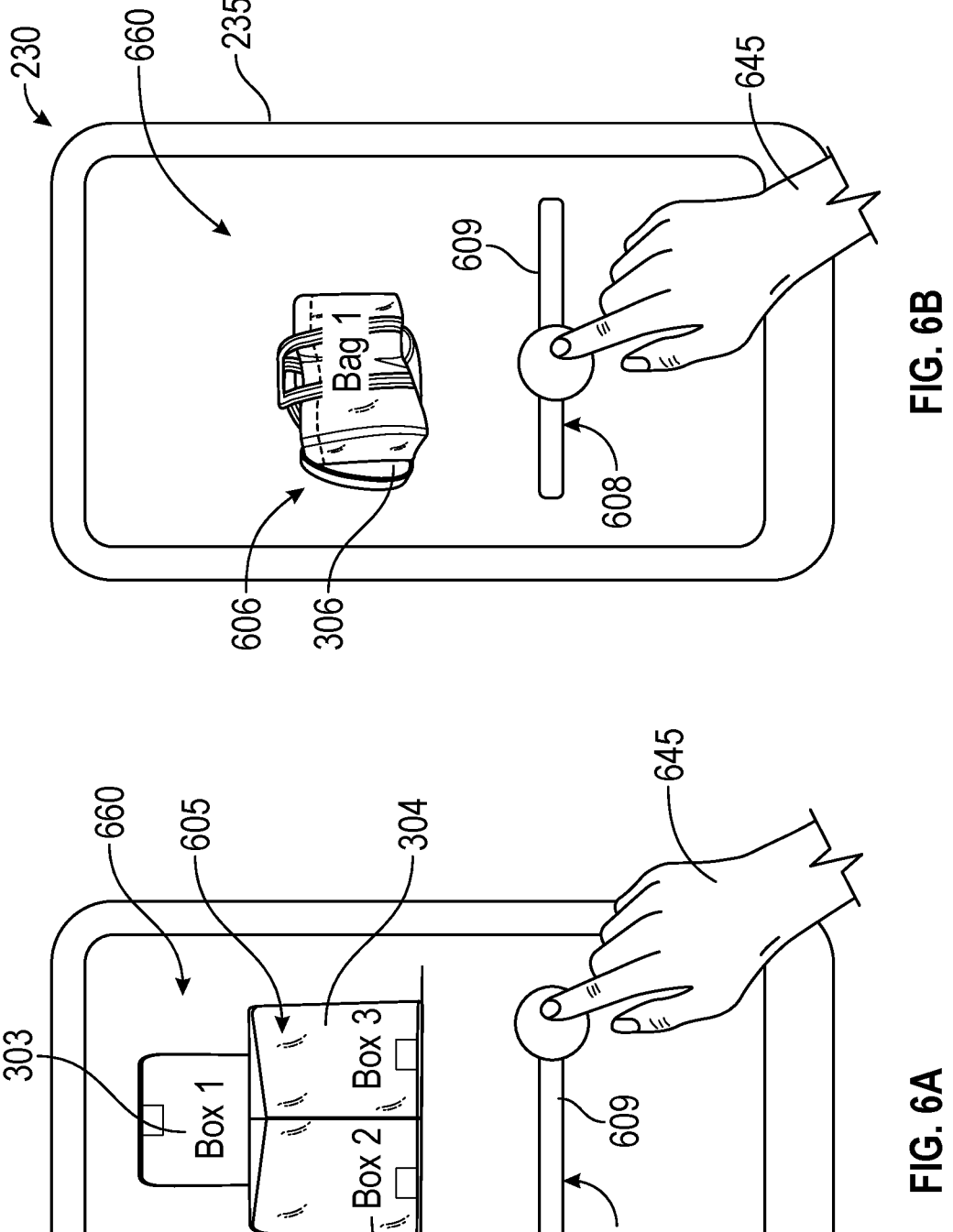
FIGS. 6A-6B illustrate examples of a user device that may be used to playback various features of the present disclosure, according to some embodiments.

FIGS. 6A-6B illustrate examples of a user device that may be used to playback features of the present disclosure, according to one embodiment. FIGS. 6A-6B include a playback feature 608 and a final virtual replication 660 of the storage area. The playback feature 608 includes a timeline 609, and a plurality of images 605-606. In one embodiment, the final virtual replication 660 includes one or more unique identifiers for each item in the storage compartment overlayed over a first virtual replication.

As previously mentioned, in one embodiment, the item management system 200 uses captured video data to create a history of the items placed in the storage compartment. The history of the items placed in the storage compartment can be displayed as a playback feature 608 on the user device. As seen in FIG. 6, the user is able to use their hand 645 to scroll through a timeline 609 of each item placed in the storage area. In one embodiment, the playback feature 608 includes a plurality of images 605-606 captured by the one or more cameras 223. Each image is associated with an individual item stored in the storage compartment. By using the playback feature 608, the user is able to scroll through the plurality of images to see the history of the captured video data to see which item was placed in the storage compartment. In another embodiment, the playback feature 608 includes a plurality of video frames spread out over a timeline 609. The video frames include video data captured by the one or more cameras 223 of the one or more items in the storage compartment. By scrolling their hand over the timeline 609, the user is able to scroll through the plurality of video frames to see a history of each item placed in the storage compartment.

Furthermore, by using the playback feature 608 to see which items were placed in the storage compartment, the user is able to deduce which items were not placed in the storage compartment. Thus assisting the user in determining whether or not he or she has forgotten to place an item in the storage compartment.

As seen further in FIGS. 6A-6B, the final virtual replication 660 includes one or more unique identifiers for each item in the storage compartment overlayed over a first virtual replication. In one embodiment, the CVP 210 uses the captured data to classify each item in the storage compartment of the vehicle. Each item is given a unique identifier (for example, box 1, box 2, box 3, bag 1). Here, the unique identifier is overlayed over each item in the first virtual replication of the storage compartment. In another embodiment, each unique identifier is displayed independently of the first virtual replication as a sortable list.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An item management system for inventorying a storage compartment of a vehicle comprising:
   one or more processors; and a memory having computer readable instructions stored thereon, which when executed by the one or more processors, cause the one or more processors to:

capture, by a camera, image data of a storage compartment of the vehicle, the image data comprising information regarding one or more items within the storage compartment of the vehicle;

generate metadata comprising a timestamp of a time when the image data of one or more items within a storage compartment of the vehicle is captured, wherein the timestamp is indicative of when an item of the one or more items is loaded or unloaded from the storage compartment;

create a three dimensional virtual replication of the storage compartment of the vehicle from the captured image data for a plurality of loading or unloading events, wherein the three dimensional virtual replication of the storage compartment includes a virtual replication of one or more occluded items in the storage compartment, wherein the virtual replication of the one or more occluded items comprises an image replication of the one or more occluded items overlaid on an image of one or more items in the storage compartment that are occluding the replicated one or more occluded items;

create a history of when the one or more items are loaded into or unloaded from the storage compartment as a sequence of image data for the plurality of loading or unloading events arranged according to a scrollable timeline display of the timestamps for the plurality of loading or unloading events to identify, based on the loading or unloading events, the one or more occluded items in the storage compartment; and transmit the three dimensional virtual replication of the storage compartment and the history of when the one or more items are loaded into or unloaded from the storage compartment, based on the captured image data, to a viewing device, wherein the viewing device is configured to display the history to allow a user to scroll through the image data for the plurality of loading or unloading events to locate at least one of the one or more occluded items.

2. The system of claim 1, wherein the viewing device includes a virtual reality device configured to allow a viewer to search through a virtual replication of each of the one or more items in the storage compartment to determine the location of the one or more occluded items.

3. The system of claim 1, wherein the memory includes instructions that when executed further cause the one or more processors to:

generate a list of each of the one or more items within the storage compartment of the vehicle during a first time period, wherein the list includes a unique identifier for each of the one or more items within the storage compartment; and transmit the list of each of the one or more items within the storage compartment to the viewing device.

4. The system of claim 1, wherein image data is captured during a plurality of time periods, each time period includes a loading or unloading event of the plurality of loading or unloading events.

5. The system of claim 4, wherein each time period starts when a door of the storage compartment is opened and stops when the door is closed.

6. An item management system for monitoring a storage compartment of a vehicle comprising:

one or more processors; and a memory having computer readable instructions stored thereon, which when executed by the one or more processors, cause the one or more processors to:

determine a plurality of time periods for a plurality loading or unloading events, wherein each time duration starts responsive to detecting that a storage compartment door is opened;

for each time period, responsive to determining that the storage compartment door is opened:

capture, by a camera, image data of a storage compartment of the vehicle, the image data comprising information regarding one or more items within the storage compartment of the vehicle;

generate metadata for each captured image, the metadata comprising a timestamp of when the image data of one or more items within a storage compartment of the vehicle is captured during a respective time period, wherein the timestamp is indicative of when an item of the one or more items is loaded or unloaded from the storage compartment;

generate a representation of the storage compartment, using the captured image data for the plurality of time periods, wherein the representation includes one or more occluded items within the storage compartment, wherein the representation of the one or more occluded items comprises an image replication of the one or more occluded items overlaid on an image of one or more items in the storage compartment that are occluding the replicated one or more occluded items;

create a history of when the one or more items are loaded into or unloaded from the storage compartment as a sequence of image data for the plurality of loading or unloading events arranged according to a scrollable timeline display of the timestamps for the plurality of time periods to identify, based on loading or unloading events, at least one of the one or more occluded items; and transmit, to a viewing device, the representation of the storage compartment and the history of when the one or more items are loaded into or unloaded from the storage compartment.

7. The system of claim 6, wherein the representation includes a three dimensional virtual replication configured to allow a user to search through the three dimensional virtual replication to locate the one or more occluded items.

8. The system of claim 6, wherein the memory includes instructions that when executed further cause the one or more processors to:

assign, based on the captured image data, a unique identifier to each of the one or more items in the storage compartment, during each respective time period;

generate a list of each of the one or more items in the storage compartment of the vehicle during each respective period, wherein the list includes the unique identifier for each of the one or more items in the storage compartment; and transmit the list of each of the one or more items to the viewing device.

9. The system of claim 6, wherein each time period stops when the storage compartment door is closed.

10. The system of claim 6, wherein the viewing device includes a virtual reality (VR) device.

11. The system of claim 6, wherein the storage compartment of the vehicle is a trunk of the vehicle.

12. A method of monitoring a storage compartment of a vehicle, comprising:

capture, by a camera, video data of a storage compartment of the vehicle, the video data comprising information regarding one or more items within the storage compartment of the vehicle;

generate metadata comprising a timestamp of a time when the video data is received, wherein the timestamp is indicative of when an item of the one or more items is loaded or unloaded from the storage compartment;

creating a three dimensional virtual replication of the storage compartment based on the captured video data of one or more items within a storage compartment of the vehicle for a plurality of loading or unloading events, wherein the three dimensional virtual replication of the storage compartment includes a virtual replication of one or more occluded items, wherein the virtual replication of the one or more occluded items comprises an image replication of the one or more occluded items overlaid on an image of one or more items in the storage compartment that are occluding the replicated one or more occluded items;

generating a history of when the one or more items are loaded into or unloaded from the storage compartment as a sequence of received video data for the plurality of loading or unloading events arranged according to a scrollable timeline display of the timestamps for the plurality of loading or unloading events to identify, based on the loading or unloading events, at least one of the one or more occluded items; and transmitting, to a viewing device, the three dimensional virtual replication of the storage compartment and the history of when the one or more items are loaded into or unloaded from the storage compartment.

13. The method of claim 12, further comprising:

assigning, based on the received video data, a unique identifier to each of the one or more items in the storage compartment;

generating a list of each of the one or more items in the storage compartment of the vehicle; and transmitting the list of each of the one or more items to the viewing device, wherein the list includes the unique identifier to each of the one or more items.

14. The method of claim 12, wherein the viewing device includes a virtual reality device.

15. The method of claim 14, wherein the virtual reality device is configured to allow a viewer to search through the three dimensional virtual replication of each item in the storage compartment to determine a location of the one or more occluded items.

16. The method of claim 12, wherein the video data for each loading or unloading event is received during a respective time duration by one or more cameras, wherein the respective time duration starts when a door of the storage compartment is opened and stops when the door is closed.

17. The system of claim 1, wherein the memory includes instructions that when executed further cause the one or more processors to:

for each loading or unloading event, stop capturing image data from the camera responsive to a determination that a door of the storage compartment is closed.

18. The system of claim 1, wherein the memory includes instructions that when executed further cause the one or more processors to:

detect, by a computer vision processor, a type of item for each of one or more items within the storage compartment of the vehicle from the captured image data; and assign a unique identifier to each of the one or more items in the storage compartment based on the detected type of item, wherein each of the unique identifiers is overlaid over a respective item of the one or more items in the three dimensional virtual replication when displayed by the viewing device.

19. The system of claim 6, wherein the memory includes instructions that when executed further cause the one or more processors to:

detect, by a classifier, a type of item for each of one or more items within the storage compartment of the vehicle during each respective time period; and assign a unique identifier to each of the one or more items in the storage compartment based on the detected type of item, wherein each of the unique identifiers is overlaid over a respective item of the one or more items in the representation of the storage compartment when displayed by the viewing device.

20. The method of claim 12, further comprising:

for each loading or unloading event, stopping the camera from capturing image data responsive to a determination that a door of the storage compartment is closed.

21. The method of claim 12, further comprising:

detecting, by a classifier, a type of item for each of one or more items within the storage compartment of the vehicle; and assigning a unique identifier to each of the one or more items in the storage compartment based on the detected type of item, wherein each of the unique identifiers is overlaid over a respective item of the one or more items in the three dimensional virtual replication when displayed by the viewing device.

* * * * *